United States Patent

[11] 3,631,675

[72] Inventors  Robert W. Keiter;
 Jack R. Taylor, both of Cincinnati, Ohio
[21] Appl. No. 862,149
[22] Filed Sept. 11, 1969
[45] Patented Jan. 4, 1972
[73] Assignee General Electric Company

[54] COMBUSTOR PRIMARY AIR CONTROL
 9 Claims, 5 Drawing Figs.
[52] U.S. Cl............................................. 60/39.65,
 60/39.23, 60/39.29, 431/353
[51] Int. Cl......................................... F02c 9/14
[50] Field of Search............................... 60/39.65,
 39.23, 39.29, 39.69, 39.74; 137/13, 13.1, 13.2,
 81.5; 415/168, 115, 116, 144, 108; 431/350–353;
 123/119, 119 C; 261/64, 69

[56] References Cited
 UNITED STATES PATENTS

| 3,527,052 | 9/1970 | Bryce | 60/39.65 |
| 2,656,096 | 10/1953 | Schwarz | 415/115 |
| 2,807,933 | 10/1957 | Martin | 60/39.65 |
| 2,812,637 | 11/1957 | Fox | 60/39.65 |
| 3,300,121 | 1/1967 | Johnson | 415/144 |
| 3,345,961 | 10/1967 | Laing | 137/81.5 |
| 3,483,699 | 12/1969 | Harvey | 60/39.74 |

FOREIGN PATENTS

| 738,006 | 10/1955 | Great Britain | 60/39.65 |

*Primary Examiner*—Douglas Hart
*Attorneys*—Derek P. Lawrence, Thomas J. Bird, Jr., Lee H. Sachs, Frank L. Neuhauser, Oscar B. Waddell and Joseph B. Forman

ABSTRACT: Apparatus is disclosed for aerodynamically varying the fuel/air ratio delivered to a primary combustion zone of a combustor, said apparatus including a snout assembly defining an inlet passage for receiving pressurized air and delivering same to the inlet of a carbureting apparatus. One wall of the inlet passage includes an exhaust manifold, actuation of which serves to divert the flow of pressurized air away from the opposite wall and thereby vary the amount of air entering the carbureting apparatus. The exhaust manifold may be replaced by a ventilating manifold and step which utilize the Coanda effect for the same purpose.

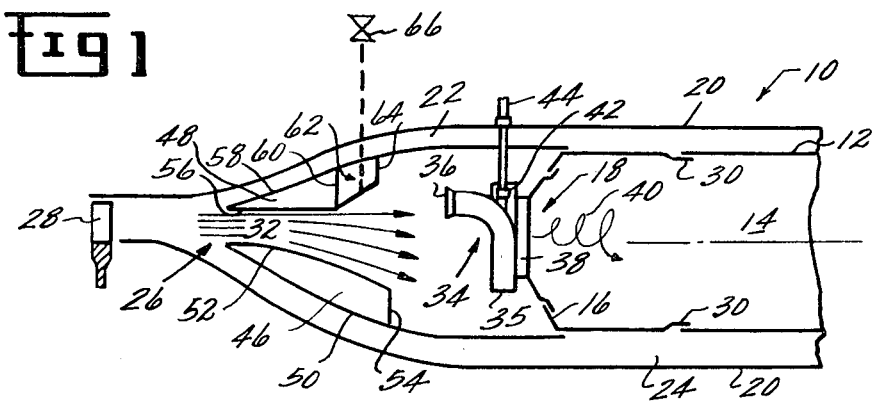
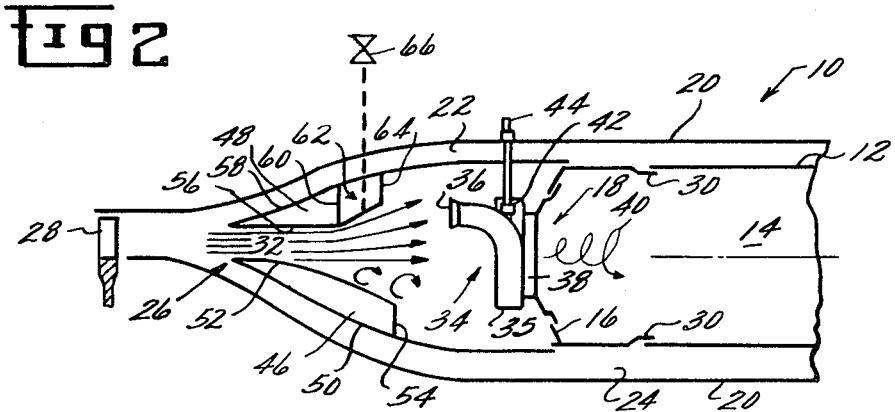

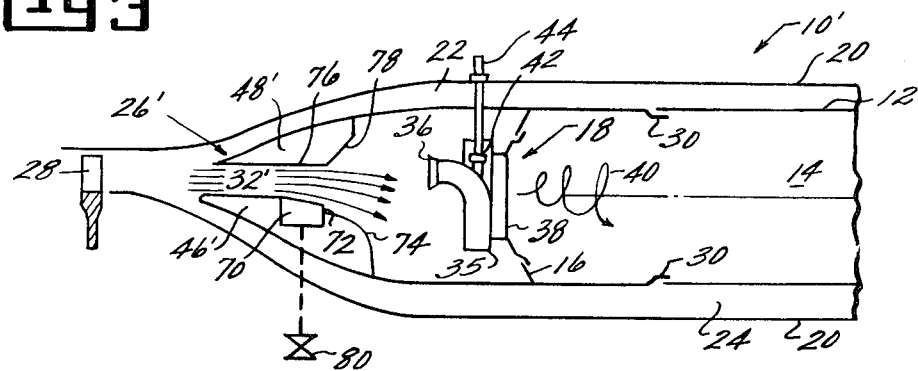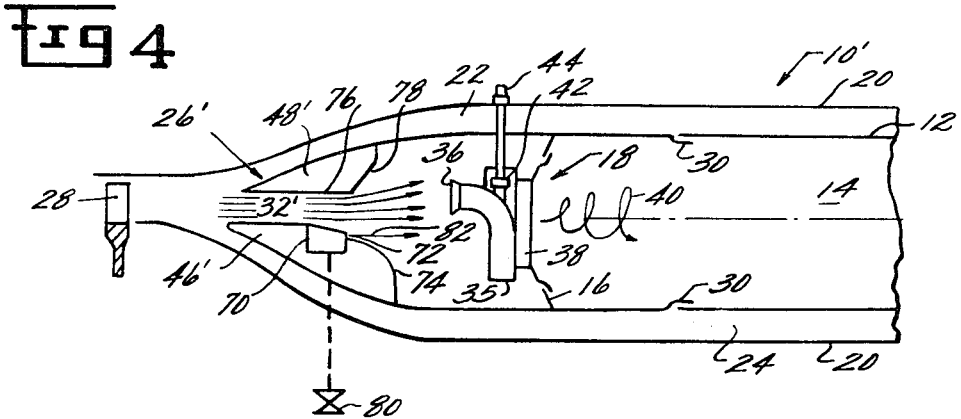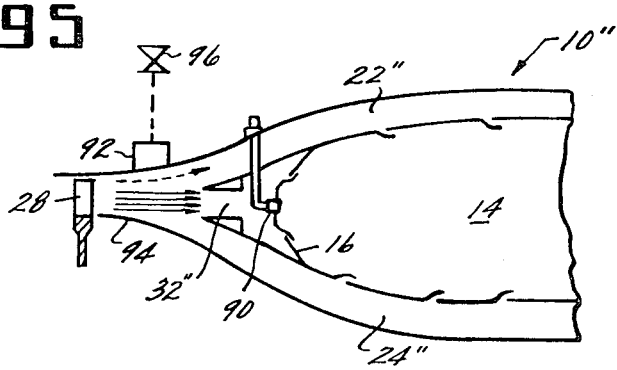

COMBUSTOR PRIMARY AIR CONTROL

BACKGROUND OF THE INVENTION

This invention relates generally to combustion apparatus and, more particularly, to apparatus for varying the fuel/air ratio to a combustion chamber.

Gas turbine engines which power modern day aircraft operate under widely varying loads and over a wide range of air inlet temperatures and pressures. In order to provide the best overall mission economy, however, the combustion system of the gas turbine engine is generally designed for most efficient operation at a certain design point. That is, the combustion system is generally designed for the air inlet temperature and pressure associated with the conditions at which the longest portion of normal flight takes place. Because the combustion system is designed for most efficient operation at a specific altitude and speed, there are certain portions of every flight during which the combustion system is operating efficiently. For example, both takeoff (for military and commercial aircraft) and high mach number conditions (for military aircraft) present conditions to the primary combustion zone of the gas turbine engine which can result in dense smoke emission due to stoichiometry variations in the combustion zone.

Present day emphasis on the elimination of air pollution has resulted in a great deal of work by gas turbine engine manufactures in an attempt to eliminate this smoke emission from gas turbine engines. Providing a variable fuel/air ratio in the primary combustion zone of the gas turbine engine has been found to be an effective means for eliminating smoke. Many previous attempts have heretofore been made to provide a variable fuel/air ratio. One proposed solution has been the provision of mechanically variable combustor inlet geometry. Such a solution, however, requires movable mechanical controls located near the high-temperature combustion zone. Such controls are subjected to a high-temperature environment which increases complexity and reduces reliability. These controls also add additional weight to the gas turbine engine and thereby reduce the amount of payload capable of being carried by an aircraft powered by the gas turbine engine.

Another proposed solution has been the use of high-pressure, counterflow air injection to divert the main air stream which enters the combustor. Such a system, however, requires the use of an additional compressor to pressurized the counterflow air to a level higher than that leaving the compressor of the gas turbine engine. The additional compressor also adds undesirably weight and complexity to the gas turbine engine.

SUMMARY OF THE INVENTION

It is an object of this invention, therefore, to provide apparatus to deliver a variably fuel/air ratio to the primary combustion zone of a gas turbine engine, which apparatus operates without the necessity of moving parts in the high-temperature region of the combustion system.

It is a further object of this invention to provide such a variable fuel/air ratio apparatus without the necessity of additional pressurized air.

It is a further object of this invention to provide a variably fuel/air ratio apparatus which operates on a purely aerodynamic basis.

Briefly stated, the objects of this invention are carried out by providing a combustion system wherein one wall of the combustor inlet includes a bleed manifold which is connected to a value located some distance from the combustor. The walls of the inlet passage are designed so that when the bleed manifold is closed a certain percentage of compressor discharge air enters the combustor inlet. For takeoff and high-speed conditions, the bleed manifold is actuated and the compressor discharge air stream becomes attached to the opposite wall. In this manner a different percentage of air is directed to the combustor inlet. In an alternative form of the invention, the bleed manifold may be replaced by a step which can be ventilated. The Coanda effect is utilized to direct a certain percentage of compressor discharge air into the combustor inlet. The step is capable of being ventilated for takeoff and high-speed conditions, thereby causing the compressor discharge air stream to be detached for the wall, and thus causing a different percentage of air to be directed into the combustor inlet.

BRIEF DESCRIPTION OF THE DRAWINGS

While the specification concludes with claims particularly pointed out and distinctly claiming the subject matter of this invention, it is believed the invention will be better understood on reading the following description of the preferred embodiment in conjunction with the accompanying drawings wherein:

FIG. 1 is a fragmentary axial cross-sectional view of an exemplary gas turbine engine combustion apparatus embodying the present invention;

FIG. 2 is a fragmentary axial cross-sectional view similar to that of FIG. 1 with the bleed manifold of the combustion apparatus in operation;

FIG. 3 is a fragmentary axial cross-sectional view of an alternative embodiment of the gas turbine engine combustion apparatus shown in FIG. 1;

FIG. 4 is a cross-sectional view, similar to FIG. 3, with the ventilation manifold in operation; and FIG. 5 is an axial cross-sectional view of a combustion apparatus with a spray-atomizing nozzle utilizing the present invention.

Referring now to the drawings wherein like numerals refer to like elements throughout, and referring particularly to FIG. 1, a continuous burning combustion apparatus of the type suitable for use in a gas turbine engine has been shown generally at 10 as comprising a hollow body 12 defining a combustion chamber 14 therein. The hollow body 12 includes a domed upstream end 16 having an opening 18 therein for receiving a fuel/air mixture. As will be understood by those skilled in the art, the combustion chamber 14 may be of the annular type, the cannular type, or the cellular type. In most designs, the apparatus 10 will have a plurality of the circumferentially spaced openings 18.

An outer shell 20 may be provided to enclose the hollow body 12 and to define passages 22 and 24 in cooperation with the hollow body 12 and a snout assembly 26. As will be understood, the passages 22 and 24 are adapted to deliver a flow of pressurized air from a suitable source, such as a compressor 28, into the combustion chamber 14 through suitable apertures or louvers 30 for cooling of the hollow body 12 and for dilution of the gaseous products of combustion in the combustion chamber 14.

The snout assembly 26 is suitably secured to the upstream end of the hollow body 12 and is adapted to function as a flow splitter to divide the pressurized air delivered from the compressor 28 between passages 22, 24, and a center passage 32 formed through the snout assembly 26.

The pressurized air which flows through the center passage 32 enters a fuel injection or carbureting apparatus, shown generally at 34. The apparatus 34 is comprised of a housing 35 having a dome inlet passage 36 for receiving the pressurized air, a central or core outlet 38 in flow communication with the hollow body opening 18 for delivery of an air/fuel mixture into the combustion chamber 14 as a vortical flow 40, and means 42 for receiving fuel from a suitable conduit 44 which extends through the snout assembly 26 and through the outer shell 20 and communicates with a source of pressurized fuel (not shown).

The housing 35 of the fuel injection or carbureting apparatus 34 defines a spin chamber adapted to receive the pressurized air via the dome inlet passage 36 and fuel via the delivery means 42. The spin chamber is adapted to vaporize and/or atomize the fuel and deliver the air and fuel mixture into the combustion chamber 14 in the form of the vortical flow 40. The fuel injection or carbureting apparatus 34 per se forms no part of this invention but is further described and claimed in a copending application Ser. No. 816,985, of J. R. Taylor, also assigned to the assignee of the present invention.

The present invention consists basically of means for varying the fuel/air ratio delivered to the combustion chamber 14, or in other words, means for varying the amount of air delivered to the dome inlet passage 36 of the fuel injection or carbureting apparatus 34. While the present invention is shown in FIGS. 1–4 as being incorporated for use with a carbureting-type fuel injection apparatus, it should be readily apparent to those skilled in the art that the invention is capable of use with spray-atomizing nozzle systems as well as other systems adapted to receive a generally axially directed flow of pressurized air for delivery into the chamber 14. Such a system is shown generally in FIG. 5.

Referring again to the embodiment of FIG. 1, the snout assembly 26 is comprised of an inner member 46 and an outer member 48. The inner member 46 includes a pair of curved walls 50 and 52, joined near their forward ends and rigidly connected by an aft wall 54. The inner wall 50 cooperates with the outer shell 20 to form the passage 24, while the wall 52 forms one portion of the central passage 32.

The outer member 48 includes a pair of walls 56 and 58, joined at their forward ends and rigidly connected by an aft wall 60, as shown in the figure. The wall 56 cooperates with the wall 52 of the inner member 46 to define the center passage 32, while the wall 58 cooperates with the outer shell 20 to form the passage 22. Located just downstream of the outer member 48 is a bleed manifold 62 which is formed of the aft wall 60 and a second wall 64 connected to the wall 58 and located substantially parallel to the wall 60. The bleed manifold 62 is in fluidic flow cooperation with the passage 32 and serves to control the direction of the flow leaving the passage 32.

Operation of the bleed manifold 62 is controlled by means of a valve 66 which may be located in a relatively cool accessible area away from the combustion chamber 14. The value 66 serves basically to open or close the bleed manifold 62 and may be either piloted, actuated by fuel pressure, temperature change, or by a cam or other mechanical means.

As previously mentioned, the bleed manifold 62 serves mainly to control the direction of the flow leaving the center passage 32. The walls 52 and 56 of the passage 32 are designed such that during normal operation the largest portion of the flow is attached to the wall 52 and is directed away from the dome inlet passage 36 such that primary combustion air to the carbureting apparatus 34 is provided by means of the static pressure drop across the dome inlet passage 36. This operation is shown schematically in FIG. 1.

For takeoff and high-speed operation the bleed manifold 62 is actuated (opened) by means of the value 66 and the primary air stream through the passage 32 becomes attached to the wall 56. The primary air stream is thus directed at the dome inlet passage 36 and thereby provides more air in the primary combustion chamber 14 by means of a dynamic pressure recovery across the dome inlet passage 36. With the bleed manifold 62 actuated, the primary air flow follows the pattern shown schematically in FIG. 2. The increased air flow entering the dome inlet passage 36 reduces the primary combustion zone fuel/air ratio and thus reduces smoke emission and flame radiation to the combustion system parts located downstream of the carbureting apparatus 34. The primary air flow not entering the dome inlet passage 36 may enter through cooling louvers in the combustor dome 16 or may be bled off around the combustor body 12 and used to cool a turbine (not shown) located downstream of the combustion zone 14, which turbine is used to drive the compressor 28.

The primary air control system as described provides a purely aerodynamic control of the amount of pressurized air entering the carbureting apparatus 34. As shown, the system is digital in operation, i.e., operates in either an ON or OFF mode. The system could, of course, be made to operate as a pure analog or as an analog of fuel flow by controlling the valve 66 to produce a fluid oscillator. The ON/OFF pulses could be timed so as to result in an almost infinite variation in the average flow entering the dome inlet passage 36. Such a variation would provide good mixing of the air and fuel in the carbureting apparatus 34.

Referring now to FIGS. 3 and 4, an alternative aerodynamic primary air control is shown. The system is similar to that shown in FIGS. 1 and 2. The snout assembly 26' again includes an inner member 46' and an outer member 48'. The inner member 46' includes a ventilation manifold 70 and a small step 72 (in place of the exhaust manifold 62) located within an inner wall portion 74 as shown in FIG. 3. The outer member 48' includes a substantially flat wall 76 and a chamfered wall 78. The inner member 46' and outer member 48' again define passages 22 and 24, which surround the combustion chamber 14, and a central passage 32'.

The passage 32' is designed such that in normal operation the principal direction of air leaving the passage 32' is away from the dome inlet passage 36. That is, the walls 74 and 76 and the step 72 are designed such that the well-known Coanda effect causes the air flow leaving the passage 32' to follow the wall 74, as generally shown by the arrows in FIG. 3.

The ventilating manifold 70 is connected to a valve 80 which controls the flow of pressurized air thereto from a source of air (not shown), but which is preferably compressed discharge air. The ventilation manifold 70 is used primarily to vary the direction of air flow leaving the passage 32'.

For takeoff and high-speed operations, the ventilation manifold 70 is filled with compressor discharge air by opening the valve 80. This pressurized air flows through an opening in the wall 74 at the step 72 (as shown schematically by arrow 82) causing the primary air stream to become detached from the wall 74 and to directed more toward the dome inlet passage 36, as shown in FIG. 4, and thereby resulting in an increased velocity head entering the dome inlet passage 36. This increased air flow to the dome inlet passage 36 reduces the primary zone fuel/air ratio and simultaneously reduces smoke emission and flame radiation to the combustion system parts located downstream of the carbureting apparatus 34.

Operation of the valve 80 can be controlled similarly to that of the valve 66 shown in FIGS. 1 and 2. That is, the overall system can be controlled by temperature change, fuel pressure, mechanical means, etc. The system again maybe either digital or analog in operation.

Referring briefly to FIG. 5, the invention is capable of use with a combustor 10'' having a conventional spray-atomizing nozzle 90 in place of the carbureting apparatus 34. A bleed manifold 92 is placed in fluidic flow cooperation with a passage 94 located downstream of the compressor 28. The passage 94 would be designed to deliver a certain percentage of the compressor discharge flow to a center passage 32'' in cooperation with the dome portion 16 of the combustor 10''. Operation of the manifold 92 could be controlled by a valve 96 to vary the amount of flow delivered to the center passage 32''. If needed, a second manifold could be located opposite the first to control the amount of flow to the passage 24''.

It can be readily seen from the above description that applicants have provided to the primary combustion zone of a gas turbine engine a variable fuel/air ratio which operates on a purely aerodynamic basis. Applicants have also provided a system which utilizes no movable parts in the high temperature regions of the combustion system. The only movable parts in the entire system are the valves needed to control the exhaust or ventilation manifolds. These valves can, of course, be located away from the high-temperature region. All internal ducts and manifolds can be made parts of the combustor and will be exposed to temperatures no higher than that of the air leaving the compressor 28. The necessary ducts and manifolds can also be used as circumferential stiffeners, thus reducing the overall mechanical stress levels in the combustor.

While the number of preferred embodiments of this invention have been shown and described, it will be obvious to those skilled in the art that there are certain changes and modifications which may be made thereto without departing from this invention in its broader aspects, and, therefore, it is intended that the appended claims cover all such changes and modifications as fall within the true spirit and scope of this invention.

What is claimed as new and desired to be secured by Letters Patent of the United States is:

1. An apparatus for controlling the fuel/air ratio delivered to a combustion chamber, said apparatus comprising:
   a fuel/air carbureting device;
   inlet means for receiving and directing air into said fuel/air carbureting device;
   means for delivering fuel to said carbureting device;
   a pair of walls defining a passage upstream of said inlet means for receiving air from a source of pressurized air and for delivering same along a predetermined path to said inlet means;
   a manifold forming a portion of one of said walls, said manifold being in fluidic flow communication with said passage; and
   valving means for selectively operating said manifold to selectively divert a portion of the air passing through said passage from its predetermined oath along a first of said walls toward the second of said walls whereby the amount of air delivered to said carbureting device and thus the fuel/air ratio delivered to said combustion chamber may be selectively varied.

2. The apparatus recited in claim 1 wherein said manifold comprises a bleed manifold and actuation of said valving means cause the air passing through said passage to be diverted toward said wall which includes said bleed manifold.

3. The apparatus recited in claim 1 wherein said manifold comprises a ventilation manifold forming a step in one of said walls said step defining an opening between said manifold and said passage.

4. The apparatus recited in claim 3 wherein said manifold lies in fluidic flow cooperation with a source of pressurized air and actuation of said valving means causes air to flow through said opening along one of said walls.

5. The apparatus recited in claim 1 wherein said fuel/air carbureting device comprises a scroll-cup-type carbureting apparatus.

6. A combustion apparatus including, in combination
   a. a hollow body defining a combustion chamber therein, said hollow body formed with an opening therein, a housing disposed outwardly of said combustion chamber and having an outlet in fluid flow communication with said hollow body opening, said housing defining a spin chamber around said outlet;
   b. inlet passage means for said housing for delivery of pressurized air and fuel to said spin chamber;
   c. a snout assembly including a pair of opposed walls defining a passage for receiving pressurized air and for delivering said air to said inlet passage means of said housing; and
   d. said assembly including aerodynamic flow diverting means for diverting the air flow through said passage from one of said walls to the opposite of said walls thereby varying the amount of pressurized air delivered to said inlet passage means of said housing.

7. The apparatus recited in claim 6 further characterized by the fact that said housing comprises a spin chamber adapted to swirl said air and fuel about said outlet and generate a vortical discharge of said air from said outlet, whereby said fuel is substantially premixed with said air and introduced into said combustion chamber with said vortical discharge in a highly disperse manner.

8. The apparatus recited in claim 7 further characterized in that said aerodynamic flow diverting means comprise a bleed manifold forming a portion of one of said walls and valving means for opening said bleed manifold to the flow of air therethrough.

9. The apparatus recited in claim 7 wherein said aerodynamic flow diverting means a comprise a ventilation manifold forming a step in one of said walls, said step defining an opening between said manifold and said passage for the flow of pressurized air therethrough, and valving means for controlling the flow of the pressurized air through said opening whereby the flow of pressurized air through said opening causes air flowing through said passage to be diverted from said wall which includes said step toward the opposite of said walls.

* * * * *

PO-1050
(5/69)

UNITED STATES PATENT OFFICE
CERTIFICATE OF CORRECTION

Patent No. 3,631,675            Dated   January 4, 1972

Inventor(s)  Robert W. Keiter et al

It is certified that error appears in the above-identified patent and that said Letters Patent are hereby corrected as shown below:

Column 5, line 22, delete the word "oath" and insert --path-- in place thereof;

Column 6, line 14, after the word "said" insert --snout--;

Column 6, line 25, delete the word "disperse" and insert --dispersed-- in place thereof; and Column 6, line 32, after the word "means" delete the word "a".

Signed and sealed this 20th day of June 1972.

(SEAL)
Attest:

EDWARD M. FLETCHER, JR.
Attesting Officer

ROBERT GOTTSCHALK
Commissioner of Patents